Oct. 1, 1935.  W. L. MARDEN  2,015,946
LIQUID STORAGE AND METERING SYSTEM
Filed Nov. 10, 1933  2 Sheets-Sheet 1

INVENTOR
William L. Marden
BY
ATTORNEYS

Patented Oct. 1, 1935

2,015,946

UNITED STATES PATENT OFFICE 2,015,946

LIQUID STORAGE AND METERING SYSTEM

William L. Marden, Jackson Heights, N. Y., assignor to Neptune Meter Company, New York, N. Y., a corporation of New Jersey Application November 10, 1933, Serial No. 697,445

4 Claims. (Cl. 137—78)

The present invention relates to liquid storage and metering systems of the type wherein provision is made for pumping liquid from suitable sources (tank cars or other sources in which the liquid is supplied) into a storage receptacle or receptacles, the system being of such character as to enable the liquid to be discharged from the storage receptacles through an outlet either by gravity or by means of the pumping mechanism.

In this connection, it is proposed to provide a metering system wherein the liquid supplied to the storage receptacles from the source of supply may be accurately metered. It is further proposed to provide for the independent metering of liquid which is discharged through the outlet in order that the readings of these meters may be checked.

The invention, moreover, proposes to provide a system wherein a condition of hydraulic equilibrium is maintained under all conditions to prevent the syphoning out of liquid from the lines of the system.

The invention constitutes an improvement over the invention shown and described in applicant's copending application Ser. No. 663,768 filed March 31, 1933 for Fluid storage and metering system, and in order that the invention may be more fully understood, reference is made to the accompanying drawings, wherein.

Figure 1:
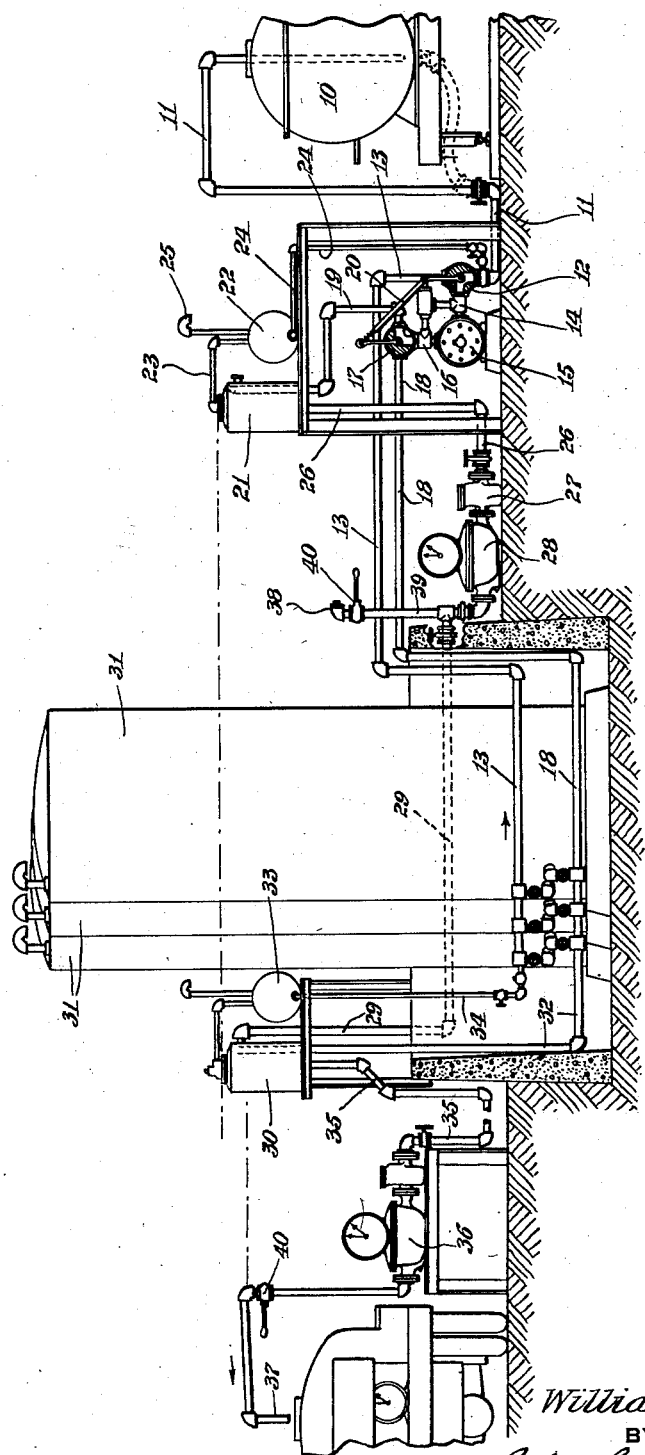
Figure 1 is a view in side elevation showing a storage and metering system constructed in accordance with the present invention, this view illustrating all of the elements of the system of the present invention.

Referring to the above drawings and particularly to Figure 1, a suitable source of supply is shown at 10 and is adapted to be connected to an inlet pipe 11 which is connected to a plug valve 12. The plug valve 12 is connected to a discharge line 13 and a fitting 14 which communicates with the pump 15. Pump 15 has an outlet fitting 16 which communicates with the plug valve 17, this valve being connected to pipes 18 and 19. The plug valves 12 and 17 are interconnected by means of a link 20 in order that proper operation of the system under all conditions is assured.

Pipe 19 communicates with the upper portion of the interior of an air release tank 21, the upper extremity of tank 21 communicating with a condensate trap 22 through a pipe 23. This condensate trap collects liquid particles which are carried from the release tank 21 and returns such particles through a pipe 24 to the supply pipe 11, the air being vented through a suitable vent 25.

From the air release tank 21 the liquid flows through a pipe 26 and sediment trap 27 to an inlet meter 28. The discharge end of the meter 28 is connected through a pipe line 29 to a second air release tank 30 provided with a siphon breaker. The second air release tank 30 communicates with storage receptacles 31 through a pipe line 32. A condensate trap 33 is provided for the air release tank 30, its construction and operation being similar to the trap 22. The fluid from trap 33 is returned to the pipe 13 by means of a pipe connection 34 in order that the collected liquid may be returned to the metering system.

From the air release tank 30, the liquid flows through a pipe 35 and discharge meter 36 to a loading rack provided with an outlet 37. Pipes 13 and 18 are connected to the storage receptacles 31 in order that liquid may be pumped from such receptacles to the loading rack and also from one receptacle to another. In addition to the pipes 13 and 18 which provide for such operation, a test plug 38 is provided, being connected to the outlet of the incoming meter 28 by means of a pipe 39. Discharge valves 40 are provided at the loading rack and at the test plug 38 whereby the flow of liquid at these locations may be suitably controlled.

It is to be noted that the air release tanks 21 and 30 are at substantially the same level, thus providing a natural trap in the piping including the intake meter. The discharge line at the loading rack is below the level of the top of the air release tank 30 but above the level of the outgoing meter, thus providing a natural trap in the piping including the outgoing meter. In this fashion, both measuring systems may be maintained full of liquid under all conditions and accurate measurement of all incoming and outgoing liquid is insured. It is to be noted further that the siphoning of liquid from the tank 21 to the tank 30 is prevented by the provision of a siphon breaker in the tank 30.

Figure 2:
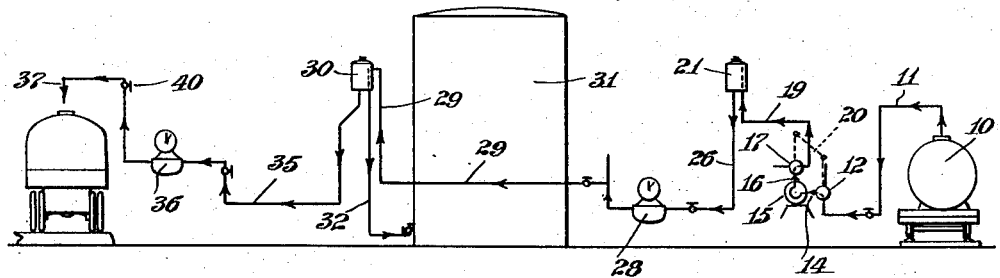
Figure 2 is a diagrammatic illustration of the path taken by the liquid in being pumped from the source of supply (tank car) to the storage receptacle and/or loading rack.

The plug valves 12 and 17 are of the three-way type with two-port plugs, the handles being interconnected by the bar 20 so that the valves can only be set in two positions, one of which is as shown in Figure 1. The other position of the valves is that wherein the inlet of the pump 15 is connected to pipe 13 and the outlet thereof to pipe 18. The operation of the system, as controlled by the valves 12 and 17, is illustrated diagrammatically in Figures 2, 3, 4 and 5, the flow of liquid illustrated by the arrowed lines of Figure 2 being from the tank car to either the storage tanks or loading rack or both. The valves 12 and 17 under these conditions are positioned as shown in Figure 1.

Figure 3:
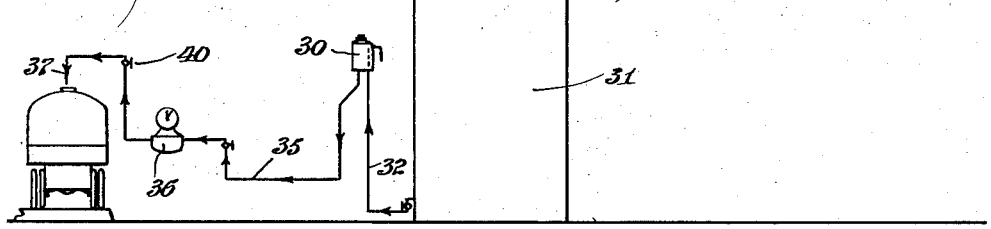
Figure 3 is a diagrammatic illustration of the flow of the liquid when discharged to the loading rack under gravity flow.
Figure 4:
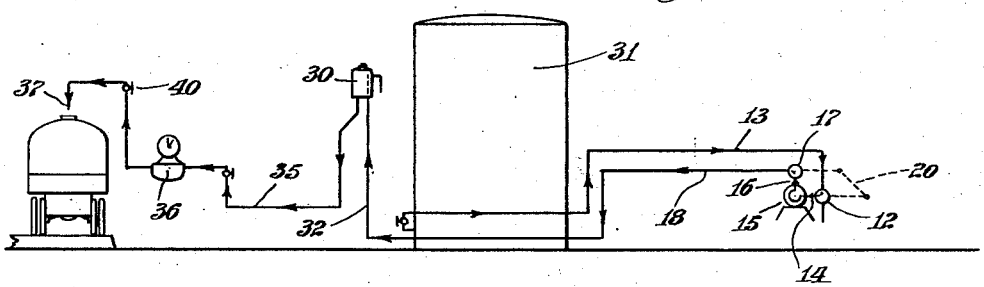
Figure 4 is a diagrammatic illustration of the liquid flow when the liquid is pumped from the storage receptacle to the loading rack.

In Figure 3 a gravity flow from the storage tank to the loading rack is illustrated and in Figure 4 a forced flow, created by the pump 15, is illustrated wherein the valves 12 and 17 are moved to connect the pump to the pipes 13 and 18.

Figure 5:
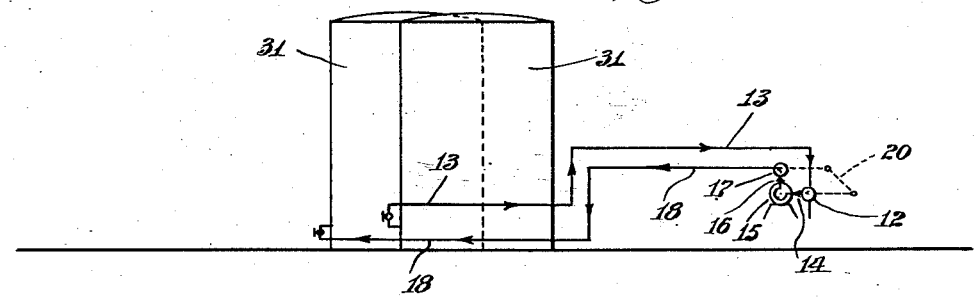
Figure 5 is a diagrammatic illustration of the liquid flow when the liquid is pumped from one storage receptacle to another.

With the valves 12 and 17 connected in this fashion pumping may also be effected from one tank to another as illustrated in Figure 5.

From the foregoing, it will be seen that the liquid in the storage tanks can never be pumped into the portion of the system including the incoming meter 28. Moreover, none of the liquid from the supply pipe 11 can be directed into the storage tanks except through the incoming meters thus insuring metering of all liquid from the supply pipe to the storage tank and loading rack.

A further condition of operation may be effected by means of the present invention, to-wit, the use of the system above described with only one meter. In this case, the incoming meter alone may be used and the outgoing meter eliminated. Under these conditions, the system described herein will prevent any liquid from passing through the incoming meter 28 twice. Moreover, it will be seen that the operations of delivering liquid to the storage tanks, transferring between storage tanks, and pumping to the loading rack or outlet may be accomplished by the use of separate pumps but the present invention provides a system by means of which only a single pump can be used.

Inasmuch as the air release tanks and discharge line to the loading rack are on substantially the same level, which is above the level of the meters, a condition of hydraulic equilibrium is established whereby, when the system is shut down, there is no movement of the liquid through leaky valves or other connections and the pipes are thus always maintained full of liquid.

While the invention has been described with specific reference to the accompanying drawings, it is not to be limited, save as defined in the appended claims.

I claim as my invention:

1. A liquid storage and metering system comprising a storage receptacle, a liquid supply, an outlet, pipe connections between the receptacle and the supply and the outlet, a meter in the pipe connections between the supply and receptacle to measure liquid from the supply, a discharge meter in the pipe connections between the outlet and receptacle to measure liquid to the outlet, a pump, pipe connections to cause only liquid from the supply to pass through the first meter, an air release tank between the supply and the first meter, and an air release tank between the pump and the second meter, said air release tanks being on substantially the same level and lying above the outlet.

2. A liquid storage and metering system comprising a plurality of storage receptacles, a liquid supply, an outlet, pipe connections between the several receptacles and the supply and pipe connections between the several receptacles and the outlet, a meter in the first named connections to measure liquid from the supply, a pump in the first named connections, said connections enabling the pump to pump liquid from the supply to the receptacles and to the outlet, and additional pipe connections between the receptacles and connected to the first named connections enabling the pump to pump liquid from one receptacle to another, said pipe connections permitting only liquid from the supply to pass through the meter.

3. A liquid storage and metering system comprising a plurality of storage receptacles, a liquid supply, an outlet, pipe connections between the several receptacles and the supply and pipe connections between the several connections and the outlet, a meter in the first named connections to measure liquid from the supply, a discharge meter in the second named connections to measure liquid flowing to the outlet, a pump in the first named connections, said connections enabling the pump to pump liquid from the supply to the receptacles and to the outlet, and additional pipe connections between the receptacles and connected to the first named connections enabling the pump to pump liquid from one receptacle to another, said pipe connections permitting only liquid from the supply to pass through the first meter.

4. A liquid storage and metering system comprising a plurality of storage receptacles, a liquid supply, an outlet, pipe connections between the several receptacles and the supply and pipe connections between the several receptacles and the outlet, a meter in the first named connections to measure liquid from the supply, a discharge meter in the second named connections to measure liquid flowing to the outlet, a pump in the first named connections, said connections enabling the pump to pump liquid from the supply to the receptacles and to the outlet, additional pipe connections between the receptacles and connected to the first named connections enabling the pump to pump liquid from one receptacle to another, said pipe connections permitting only liquid from the supply to pass through the first meter, an air release tank in the connections between the supply and the first meter, and an air release tank in the connections between the pump and the second meter.

WILLIAM L. MARDEN.